(12) United States Patent
Hart (10) Patent No.: US 10,434,954 B2
(45) Date of Patent: Oct. 8, 2019

(54) MOUNTING ARRANGEMENT FOR A DRIVER ASSIST SYSTEM HOUSING

(71) Applicant: TRW AUTOMOTIVE U.S. LLC, Livonia, MI (US)

(72) Inventor: Michael A. Hart, Dexter, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 0 days.

(21) Appl. No.: 15/548,958

(22) PCT Filed: Mar. 14, 2016

(86) PCT No.: PCT/US2016/022298
§ 371 (c)(1),
(2) Date: Aug. 4, 2017

(87) PCT Pub. No.: WO2016/145433
PCT Pub. Date: Sep. 15, 2016

(65) Prior Publication Data
US 2018/0065571 A1 Mar. 8, 2018

Related U.S. Application Data

(60) Provisional application No. 62/132,043, filed on Mar. 12, 2015.

(51) Int. Cl.
*A47B 96/00* (2006.01)
*B60R 11/04* (2006.01)
(Continued)

(52) U.S. Cl.
CPC .......... *B60R 11/04* (2013.01); *H04N 5/2251* (2013.01); *B60R 2011/0026* (2013.01); *B60R 2011/0061* (2013.01); *F16B 21/09* (2013.01)

(58) Field of Classification Search
CPC ............. B60R 11/04; B60R 2011/0026; B60R 2011/0061
(Continued)

(56) References Cited

U.S. PATENT DOCUMENTS 4,648,572 A * 3/1987 Sokol ...................... B60R 11/02
248/205.2
5,016,850 A * 5/1991 Plahn ......................... B60J 1/20
248/206.3

(Continued)

FOREIGN PATENT DOCUMENTS

DE 102010026218 1/2012

OTHER PUBLICATIONS

PCT/US2016/022298 International Search Report and Written Opinion, completed Apr. 29, 2016.

*Primary Examiner* — Gwendolyn W Baxter
(74) *Attorney, Agent, or Firm* — Tarolli, Sundheim, Covell & Tummino LLP (57) ABSTRACT

A mounting arrangement for securing a housing to a windshield of the vehicle includes a mounting bracket having a plurality of keyhole slots, each having a receiving opening at one end of the keyhole slot, a locking recess at another end of the keyhole slot, and a ramp connecting the receiving opening with the locking recess. A plurality of mounting posts each including a base portion, a head portion, and a collar portion are mounted to the windshield and positioned to align with associated keyhole slots in the mounting bracket. The keyhole slots and the mounting posts are arranged such that the head portion of each mounting post is received into the receiving opening of its associate keyhole slot, slidable up the ramp of its associated keyhole slot, and lockable into the locking recess of its associated keyhole slot. The housing is attachable to the mounting bracket.

18 Claims, 6 Drawing Sheets

(51) Int. Cl.
*H04N 5/225* (2006.01)
*F16B 21/09* (2006.01)
*B60R 11/00* (2006.01)

(58) Field of Classification Search
USPC .... 248/208, 221.12, 222.21, 222.41, 222.12, 248/206.2, 206.3
See application file for complete search history.

(56) References Cited

U.S. PATENT DOCUMENTS

| | | | |
|---|---|---|---|
| 5,420,762 A | | 5/1995 | Lewis |
| 5,911,395 A | * | 6/1999 | Hussaini ................ B60R 11/00 |
| | | | 248/206.3 |
| 7,081,736 B2 | * | 7/2006 | Seil .................... H01M 2/1055 |
| | | | 320/114 |
| 9,877,096 B2 | * | 1/2018 | Harms .................. H04R 1/026 |
| 2004/0099775 A1 | * | 5/2004 | Zheng .................... B60R 11/02 |
| | | | 248/206.3 |
| 2007/0167089 A1 | * | 7/2007 | Gobron ................ H01R 13/025 |
| | | | 439/860 |
| 2010/0050706 A1 | | 3/2010 | O'Neill |
| 2012/0099850 A1 | | 4/2012 | Onishi et al. |
| 2015/0015713 A1 | | 1/2015 | Wang et al. |
| 2016/0216595 A1 | * | 7/2016 | Carlson ................ G03B 17/561 |

* cited by examiner

MOUNTING ARRANGEMENT FOR A DRIVER ASSIST SYSTEM HOUSING

RELATED APPLICATIONS

This application claims priority from U.S. Provisional Application No. 62/132,043, filed Mar. 12, 2015, the entirety of which is incorporated herein by reference.

FIELD OF THE PRESENT INVENTION

The present invention is directed to a mounting arrangement for a driver assist system housing and, more particularly, to a mounting arrangement for a driver assist system housing that is mounted to a vehicle windshield.

BACKGROUND

Vehicle driver assist systems that use a camera to monitor the environment surrounding the vehicle are known. For example, one particular type of driver assist system monitors the area in front of the vehicle and uses a forward looking camera. It is common to mount a forward looking driver assist system to the front windshield of the vehicle. Such a forward looking driver assist system can aid a driver in the operation of a motor vehicle by providing operational information such as a potential collision, lane or roadway departure, location of pedestrians, road sign information, etc. Driver assist systems could also be mounted to other vehicle locations such as the rear window. Data from the driver assist system is provided to other vehicle systems to provide the driver with a warning, haptic or tactile feedback, and/or autonomous control of the vehicle.

One known arrangement for mounting an accessory to a vehicle windshield is shown in U.S. Pat. No. 4,930,742.

SUMMARY OF THE PRESENT INVENTION

The present invention provides a mounting arrangement for securing a housing to a windshield of the vehicle including a mounting bracket having a plurality of the keyhole slots, each having a receiving opening at one end of the keyhole slot, a locking recess at another end of the keyhole slot, and a ramp connecting the receiving opening with the locking recess. A plurality of mounting posts each including a base portion, a head portion, and a collar portion are mounted to the windshield and positioned to align with associated keyhole slots in the mounting bracket. The keyhole slots and the mounting posts are arranged such that the head portion of each mounting post is received into the receiving opening of the associated keyhole slot, slidable up the ramp of its associated keyhole slot, and lockable into the locking recess of its associated keyhole slot. The housing is attachable to the mounting bracket.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
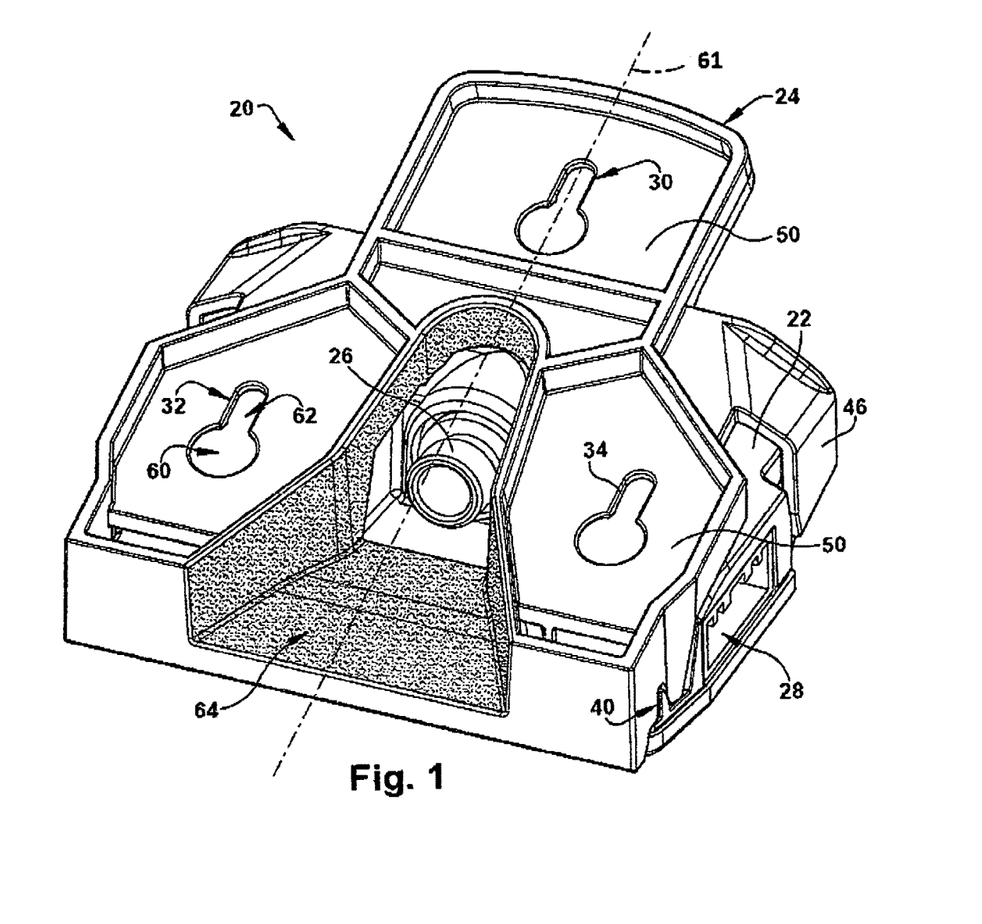
FIG. 1 is a perspective view of a driver assist system in accordance with one example embodiment of the present invention showing a housing secured in a mounting bracket.
Figure 2:
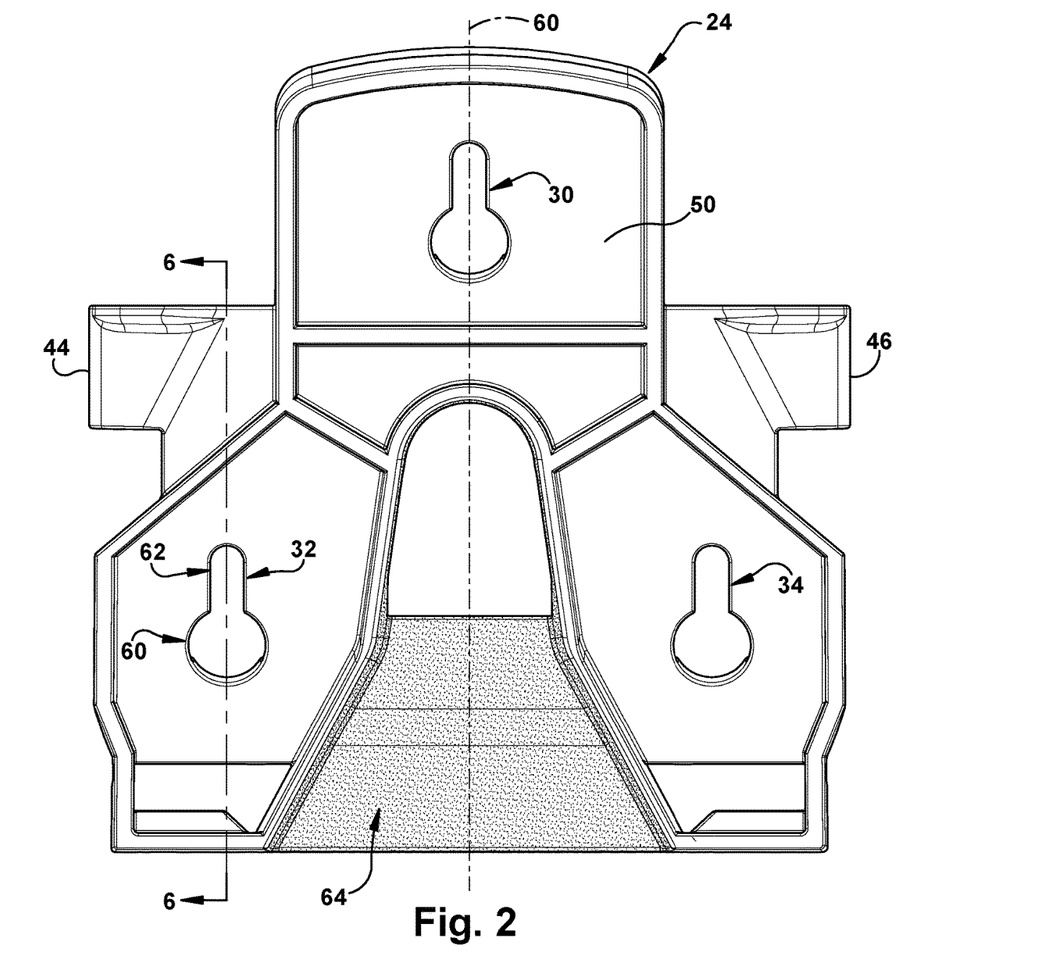
FIG. 2 is a top plan view of the mounting bracket shown in FIG. 1.
Figure 3:
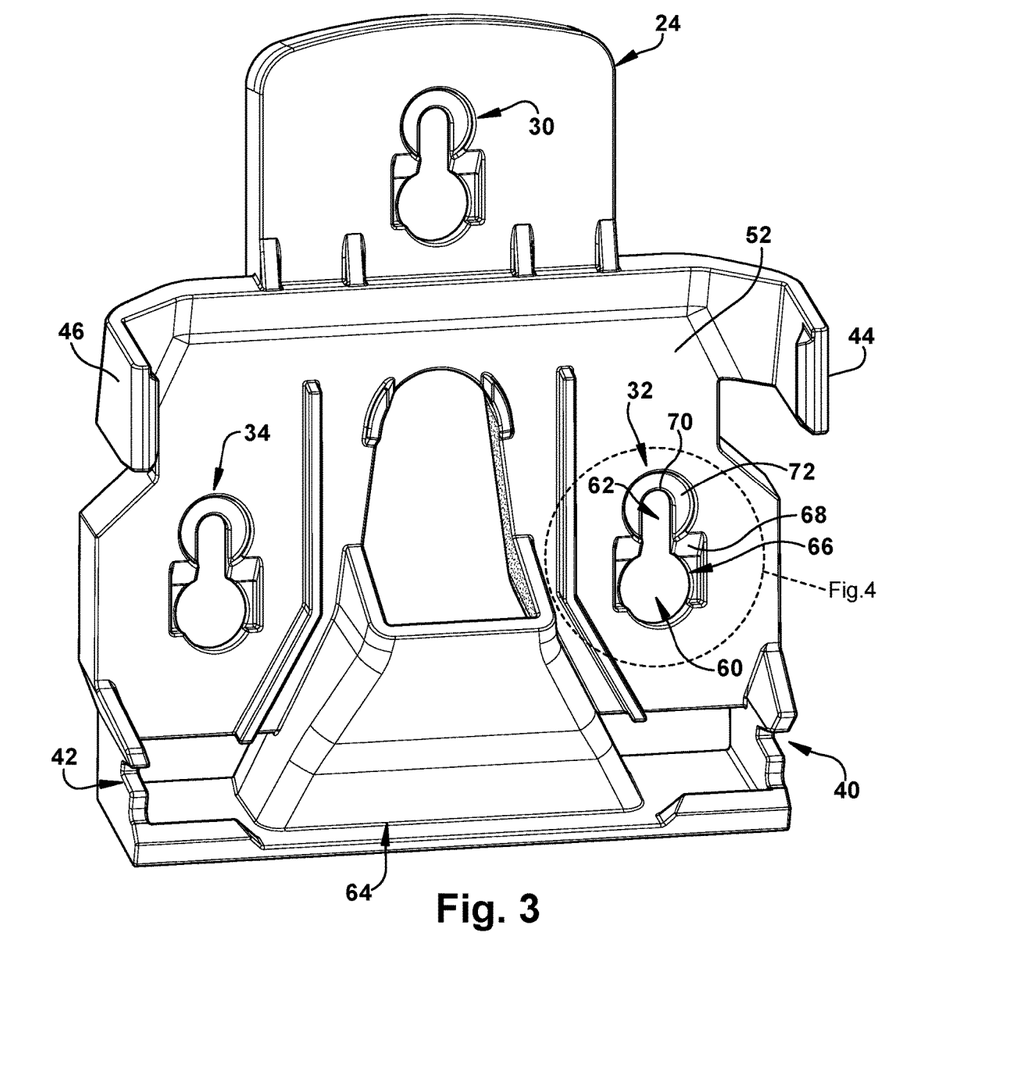
FIG. 3 is a bottom perspective view of the mounting bracket shown in FIG. 1.

Referring to FIG. 1, a driver assist system module 20 is shown including a driver assist system (DAS) housing 22 secured in a mounting bracket 24. A camera 26 is mounted within the housing 22. The camera 26 is operatively connected to data processing circuitry (not shown) within the DAS housing 22 for processing any image within the field of view of the camera 26. The circuitry within the housing 22 is connectable with other vehicle systems via a connector 28 of the housing 22. For the purposes of explanation, the driver assist system module 20 is a forward looking system and is described as being mounted to a front windshield of a vehicle. The driver assist system module in accordance with the described example embodiment, views the environment forward of the vehicle and analyze monitored information such as lane keeping, roadway departures, pedestrian information, road sign information, etc. The analyzed information is then further processed and used by vehicle control systems and/or warning systems. Those skilled in the art will appreciate that the present invention is applicable to other driver assist systems such as a rearward facing system for monitoring the environment rearward of the vehicle.

Referring to FIGS. 1-4, the mounting bracket 24, in accordance with an example embodiment of the present invention, includes a plurality of spaced apart keyhole slots 30, 32, 34. The keyhole slots 30, 32, 34 are located at the vertices of a triangle but those skilled in the art will appreciate that other locations, patterns, and/or number of keyhole slots can be used.

The mounting bracket 24 includes forward alignment slots 40, 42 and rearward locking arms 44, 46 that aid in securing the housing 22 into the mounting bracket 24. The mounting bracket 24 has an Outer mounting face 50 that, when mounted to the vehicle, faces the windshield. The mounting bracket 24 further includes an inside mounting face 52 that faces the driver assist housing 22 when the driver assist housing 22 is mounted into the mounting bracket 24. The mounting bracket 24 is substantially symmetrical about the central front-to-rear axis 61. A camera viewing window 64 is provided in both the mounting bracket 24 and the driver assist module housing 22 so as to permit an unobstructed forward field of view for the camera 26 in front of the vehicle.

Figure 4:
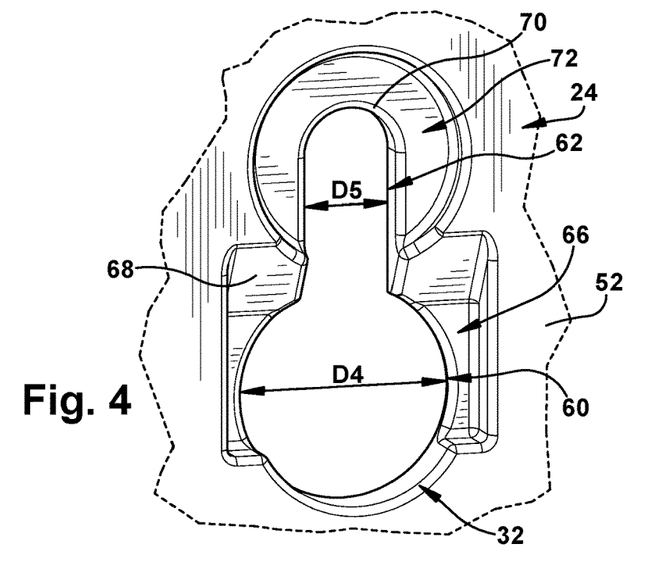
FIG. 4 is an enlarged partial bottom view showing one of the keyhole slots of the mounting bracket shown in FIG. 3.

For the purposes of brevity, only the keyhole slot 32 is described in detail, it being understood that the other keyhole slots 30, 34 are similarly constructed. The side of the keyhole slot 32 facing the mounting face 50 is substantially planar. The side of the keyhole slot 32 facing the inside face 52 has several associated dimensioned surfaces. In particular, the keyhole slot 32 has a generally circular receiving hole 60 and an elongated slot opening 62. Surrounding the generally circular receiving hole 60 is an opening recess 66 in the inside face 52. The recess 66 has a predetermined depth. A ramp surface 68 extends from the opening recess 66 toward the inside face 52 and extends from the circular receiving hole 60 toward the elongated slot 62. The distal end 70 of the elongated slot 62 has an associated generally circular locking recess 72 having a predetermined depth below the face 52. The circular locking recess 72 is positioned at the upper end of the ramp 68. The ramp 68 connects the recess 66 to the locking recess 72.

Figure 5:
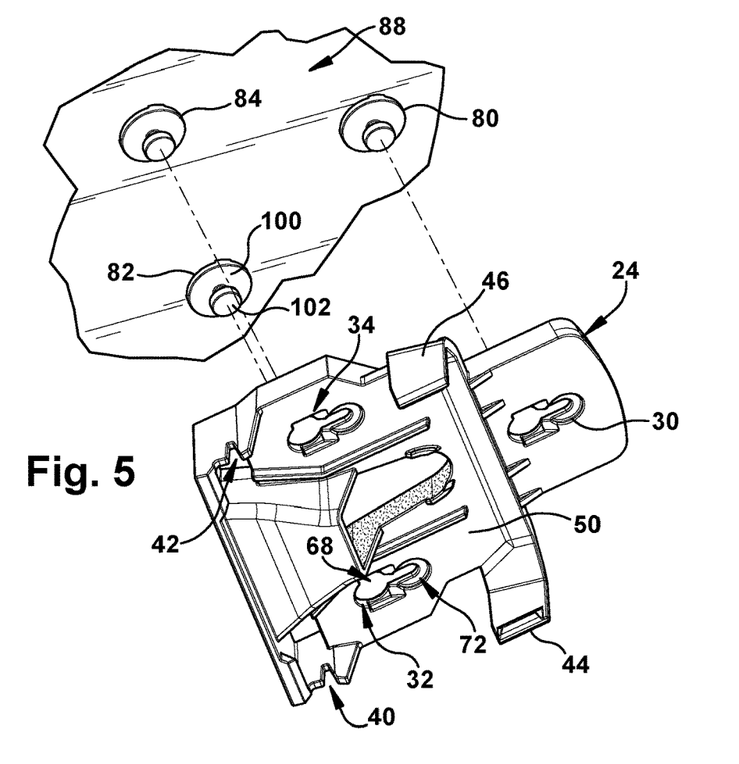
FIG. 5 is a perspective exploded view illustrating alignment of the mounting bracket shown in FIG. 1 with associated mounting posts secured to the inside of a vehicle windshield.
Figure 6:
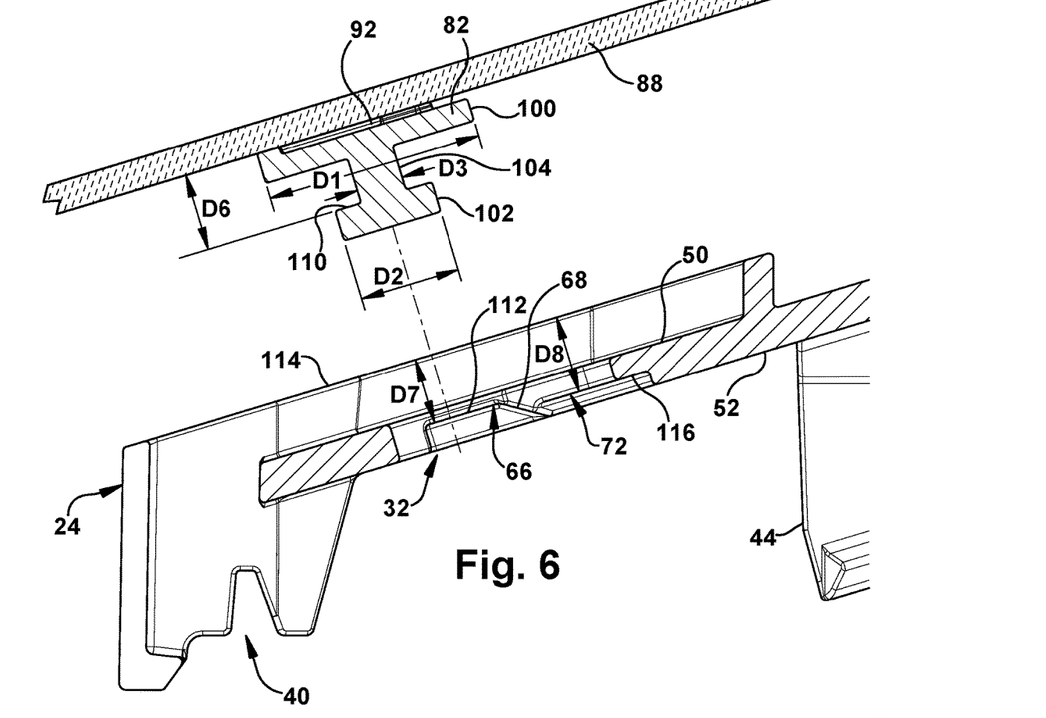
FIG. 6 is an exploded side sectional view of a portion of the mounting bracket taken along line 6-6 in FIG. 2 showing the alignment between one of the mounting posts and an associated keyhole slot in more detail.
Figure 7:
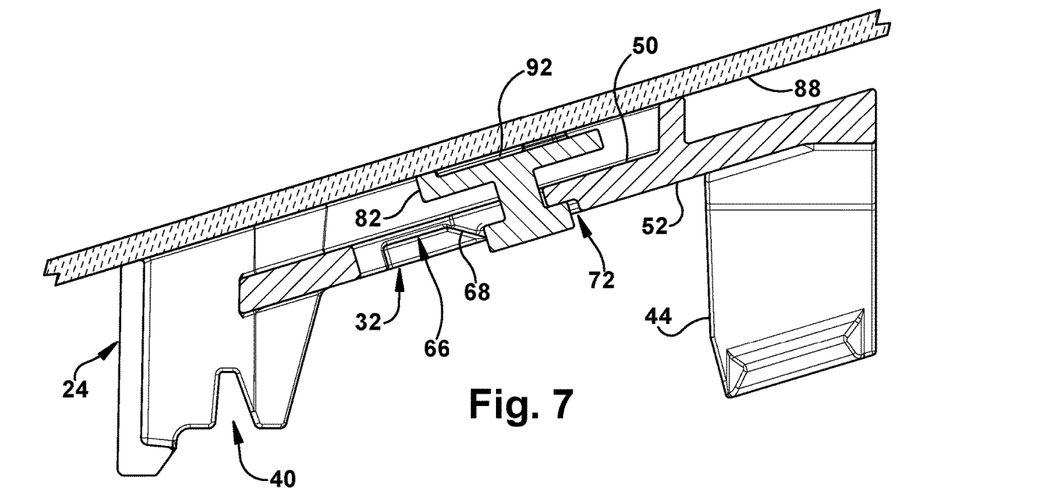
FIG. 7 is an exploded side section view of the arrangement of FIG. 6 showing the mounting bracket secured to its associated mounting post.

Referring to FIGS. 5-7, the mounting arrangement, in accordance with the present invention, includes a plurality of mounting posts 80, 82, 84, each of which are secured to the inside of the windshield 88 of a vehicle using an appropriate adhesive 92. As mentioned above, the number of keyholes and mounting posts could be a number other than three. The mounting posts 80, 82, 84 are positioned on the windshield at appropriate locations commensurate with the keyhole slots 30, 32, 34, respectively, so that each mounting post aligns with its associated keyhole slot. In the described example embodiment, the mounting posts and keyhole slots are located at the vertices of a triangle. Each of the mounting posts 80, 82, 84 is similarly constructed. For simplicity, only the detailed structure of mounting post 82 is described in detail.

Mounting post 82 includes a base portion 100, a head portion 102, and a connecting collar 104. In accordance with this example embodiment, the base portion 100, the head portion 102, and the connecting collar 104 are all cylindrically shaped. The diameter D1 of the base portion 100 is greater than the diameter D2 of the head portion 102 which is, in turn, greater than the diameter D3 of the collar portion 104, i.e., D1>D2>D3. The diameter D4 of the keyhole receiving hole 60 is slightly greater than the diameter D2 of the head portion 102 of the mounting post. The diameter or width D5 of the keyhole slot 62 is slightly greater than the diameter D3 of the collar portion 104 of the mounting post but less than the diameter D2 of the head portion 102 of the mounting post. The distance D6 from the base of the mounting post to the surface 110 of the head portion 102 is greater than the distance D7 between the bottom wall 112 of the opening 60 and the windshield mating surface 114 of the mounting bracket 24. The distance D6 is approximately equal to the distance D8 between the mating surface 114 of the mounting bracket 24 and the bottom wall 116 of the locking recess 72. It should be appreciated that once the mounting bracket 24 is received onto the mounting posts 80, 82, 84 and then slid forward, the mounting bracket locks in place once each of the associated head portions of the mounting posts are received into their associated locking recesses. The associated ramps tend to tighten the mounting bracket 24 against the windshield 88 during the sliding of the bracket into the locking position shown in FIG. 7.

Figure 8:
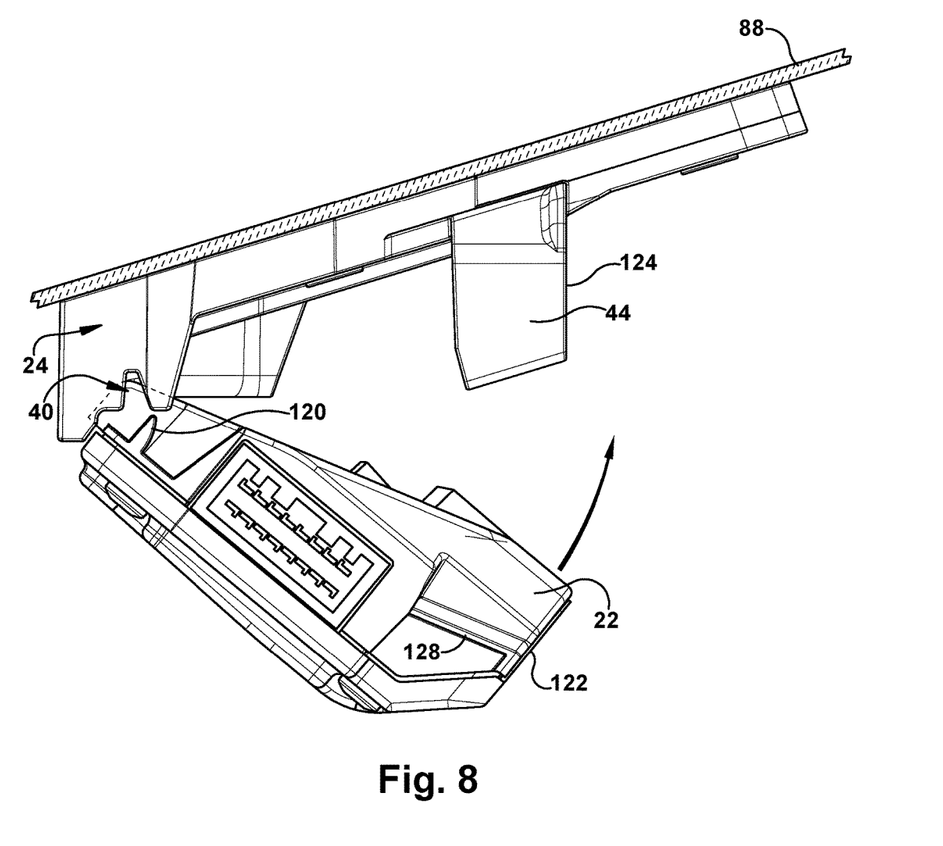
FIG. 8 is a side view showing the housing of the driver assist system as it is being mounted in the mounting bracket of FIG. 1.

Referring to FIG. 8, after the mounting bracket 24 is secured to the windshield 88, the DAS housing 22 is snapped into the bracket 24 by first inserting the alignment extensions 120 into the associated front alignment openings 40 and then pivoting the rear end 122 of the housing 22 into the rear portion 124 of the mounting bracket 24. The rear locking arms 44, 46 lock onto associated locking tabs of the housing 22 thereby securing the housing 22 into the bracket 24. Only locking tab 128 associated with locking arm 44 is shown.

From the above description of the present invention, those skilled in the art will perceive improvements, changes, and modifications. Such improvements, changes, and modifications within the skill of the art are intended to be covered by the appended claims.

Having described the present invention, the following is claimed:

1. A mounting arrangement for securing a housing to a windshield of a vehicle comprising:
   a mounting bracket including a plurality of keyhole slots, each having a receiving opening at one end of the keyhole slot, a locking recess at another end of the keyhole slot, and a ramp connecting the receiving opening with the locking recess; and
   a plurality of mounting posts, each mounting post having a base portion, a head portion, and a collar portion connecting the head portion to the base portion, said each mounting post being mounted to the windshield and positioned to align with associated keyhole slots in the mounting bracket;
   said each of the keyhole slots and the mounting posts being arranged such that the head portion of the post is received into the receiving opening of its associated keyhole slot, the head portion being slidable up the ramp of its associated keyhole slot, and the head portion being lockable into the locking recess of its associated keyhole slot, each of the ramps tending to tighten the mounting bracket against the windshield during the sliding of the head portions up the ramps;
   the housing being attachable to the mounting bracket.

2. A mounting arrangement as set forth in claim 1 wherein each base portion has a diameter greater than a diameter of the head portion.

3. A mounting arrangement as set forth in claim 2 wherein the diameter of the head portion is greater than the diameter of the collar portion.

4. A mounting arrangement as set forth in claim 2 wherein each of the keyhole receiving openings has a diameter slightly greater than the diameters of the head portions of the mounting posts.

5. A mounting arrangement as set forth in claim 4 wherein said each of the keyhole slots has a width greater than each of the diameters of the collar portions.

6. A mounting arrangement as set forth in claim 5 wherein the width of said each of the keyhole slots is less than the diameters of the head portions.

7. A mounting arrangement as set forth in claim 1 wherein a distance from the base portion of the mounting post to a surface of the head portion facing the base portion is greater than a distance between a bottom wall of the receiving opening and a windshield mating surface of the mounting bracket.

8. A mounting arrangement as set forth in claim 7 wherein the distance from the base portion to the surface of the head portion facing the base portion is approximately equal to a distance between the mating surface of the mounting bracket and a bottom wall of the locking recess.

9. The mounting arrangement as set forth in claim 1, wherein the mounting bracket has an outer mounting face that faces the windshield, the head portion moving toward the outer mounting face and into the locking recess after being slid up the ramp.

10. The mounting arrangement as set forth in claim 1, wherein the housing is a driver assist system housing.

11. The mounting arrangement as set forth in claim 1, wherein both the ramp and the locking recess of said each of the keyhole slots are positioned on a side of their associated keyhole slot that faces an inside face of the mounting bracket so that after the head portion is slid up the ramp of its associated keyhole slot, the head portion is positioned on and locked into the locking recess of its associated keyhole slot.

12. A mounting arrangement for securing a housing to a windshield of a vehicle comprising:
   a mounting bracket including a plurality of keyhole slots, the keyhole slots being located at vertices of a triangle, each of the keyhole slots having a receiving opening at one end of the keyhole slot, a locking recess at another end of the keyhole slot, and a ramp connecting the receiving opening with the locking recess; and
   a plurality of mounting posts, each mounting post having a base portion, a head portion, and a collar portion connecting the head portion to the base portion, said each mounting post being mounted to the windshield and positioned to align with associated keyhole slots in the mounting bracket;
   said each of the keyhole slots and the mounting posts being arranged such that the head portion of the post is received into the receiving opening of its associated keyhole slot, the head portion being slidable up the ramp of its associated keyhole slot, and the head portion being lockable into the locking recess of its associated keyhole slot;
   the housing being attachable to the mounting bracket.

13. The mounting arrangement as set forth in claim 12, wherein both the ramp and the locking recess of said each of the keyhole slots are positioned on a side of their associated keyhole slot that faces an inside face of the mounting bracket so that after the head portion is slid up the ramp of its associated keyhole slot, the head portion is positioned on and locked into the locking recess of its associated keyhole slot.

14. A mounting arrangement for securing a housing to a windshield of a vehicle comprising:
   a mounting bracket including a plurality of keyhole slots, each having a receiving opening at one end of the keyhole slot, a locking recess at another end of the keyhole slot, and a ramp connecting the receiving opening with the locking recess; and
   a plurality of mounting posts, said each mounting post having a base portion, a head portion, and a collar portion connecting the head portion to the base portion, said each mounting post being mounted to the windshield and positioned to align with associated keyhole slots in the mounting bracket, said each base portion having a diameter greater than a diameter of the head portion, the diameters of the head portions being greater than diameters of the collar portions;
   each of the keyhole receiving openings having a diameter slightly greater than the diameters of the head portions of the mounting posts, each of the keyhole slots having a width extending from the receiving openings to the locking recesses greater than said each of the diameters of the collar portions, the width of said each of the keyhole slots being less than the diameters of the head portions;
   a distance from said each of the base portions of the mounting posts to surfaces of the head portions facing the base portions being greater than distances between bottom walls of the receiving openings and a windshield mating surface of the mounting bracket, the distances from the base portions to the surfaces of the head portions facing the base portions being approximately equal to distances between the mating surface of the mounting bracket and bottom walls of the locking recesses;
   said each of the keyhole slots and the mounting posts being arranged such that the head portion of a post is received into the receiving opening of its associated keyhole slot, the head portion being slidable up the ramp of its associated keyhole slot, and the head portion being lockable into the locking recess of its associated keyhole slot, each of the ramps tending to tighten the mounting bracket against the windshield during the sliding of the head portions up the ramps;
   the housing being attachable to the mounting bracket.

15. A mounting arrangement as set forth in claim 14 wherein the keyhole slots are located at vertices of a triangle.

16. The mounting arrangement as set forth in claim 14, wherein the head portion moves toward the windshield mating surface of the mounting bracket and into the locking recess after being slid up the ramp.

17. The mounting arrangement as set forth in claim 14, wherein the housing is a driver assist system housing.

18. The mounting arrangement as set forth in claim 14, wherein both the ramp and the locking recess of said each of the keyhole slots are positioned on a side of their associated keyhole slot that faces an inside face of the mounting bracket so that after the head portion is slid up the ramp of its associated keyhole slot, the head portion is positioned on and locked into the locking recess of its associated keyhole slot.

* * * * *